US010423992B2

(12) United States Patent
Wydroug et al.

(10) Patent No.: US 10,423,992 B2
(45) Date of Patent: Sep. 24, 2019

(54) METHOD, SYSTEM, AND MEDIUM FOR EVENT BASED VERSIONING AND VISIBILITY FOR CONTENT RELEASES

(71) Applicant: Microsoft Technology Licensing, LLC, Redmond, WA (US)

(72) Inventors: Zoe Miriam Wydroug, Seattle, WA (US); Asha D'Costa, Kirkland, WA (US); Todd Dale Ostermeier, Kenmore, WA (US); Deepak Babu Mukunthu Iyappan Babu, Bellevue, WA (US); Andre C. Chen, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1537 days.

(21) Appl. No.: 13/917,622

(22) Filed: Jun. 13, 2013

(65) Prior Publication Data

US 2014/0372239 A1     Dec. 18, 2014

(51) Int. Cl.
*G06Q 30/00* (2012.01)
*G06Q 30/06* (2012.01)

(52) U.S. Cl.
CPC .............. *G06Q 30/0601* (2013.01)

(58) Field of Classification Search
CPC .............................. G06Q 30/0601
(Continued)

(56) References Cited

U.S. PATENT DOCUMENTS 6,088,693 A * 7/2000 Van Huben ......... G06F 16/2343
7,031,954 B1    4/2006 Kirsch
(Continued)

FOREIGN PATENT DOCUMENTS

CN      1229955 C     11/2005
CN    100444589 C     12/2008
WO   2012139903 A2    10/2012

OTHER PUBLICATIONS

IBM FileNet Content Manager Implementation Best Practices and Recommendations (Year: 2013).*
(Continued)

*Primary Examiner* — Jeffrey A. Smith
*Assistant Examiner* — Lalith M Duraisamygurusamy (57) ABSTRACT

The present invention extends to methods, systems, and computer program products for event-based versioning and visibility for content releases. In general, embodiments of the invention categorize content releases, wherein each release can have a different designation, such as, for example, public, limited, limited for down-level clients, etc. Content (e.g., applications, store pages, ratings, reviews, etc.) offered by a content provider (e.g., an online store) can be associated with a specified operating system/store release. Different versions of the same content can potentially be associated with different specified operating system/store releases. When a content release is unveiled, the categorization for the content release can be updated so that the corresponding content is publicly available without changes to the content itself. Accordingly, content can be tied to a system event helping ensure a consistent view of the content and minimizing the number of operations for changing content visibility.

20 Claims, 5 Drawing Sheets

(58) Field of Classification Search
USPC .................................................. 705/26.1
See application file for complete search history.

(56) References Cited

U.S. PATENT DOCUMENTS

| | | | |
|---|---|---|---|
| 7,673,026 | B2 | 3/2010 | Jardin et al. |
| 8,019,780 | B1 | 9/2011 | Pinkerton et al. |
| 8,276,121 | B2 | 9/2012 | Miller et al. |
| 8,468,577 | B1* | 6/2013 | Pooley ................ G06F 21/604 |
| | | | 726/1 |
| 2004/0044774 | A1 | 3/2004 | Mangalik et al. |
| 2005/0075093 | A1 | 4/2005 | Lei et al. |
| 2009/0089323 | A1 | 4/2009 | Yoshihama |
| 2009/0144395 | A1* | 6/2009 | DeSalvo ............ G06F 17/30902 |
| | | | 709/219 |
| 2009/0313224 | A1* | 12/2009 | Fields ................ G06F 17/3089 |
| 2010/0299663 | A1 | 11/2010 | Weissman et al. |
| 2011/0107199 | A1* | 5/2011 | Bellessort .......... G06F 17/3089 |
| | | | 715/234 |
| 2012/0096094 | A1 | 4/2012 | So et al. |
| 2012/0210205 | A1* | 8/2012 | Sherwood ......... G06F 17/30058 |
| | | | 715/234 |
| 2012/0291090 | A1 | 11/2012 | Srinivasan et al. |
| 2012/0330792 | A1* | 12/2012 | Kashanian .......... H04L 12/1475 |
| | | | 705/27.1 |
| 2013/0085585 | A1* | 4/2013 | Griffen ................ A63F 3/022 |
| | | | 700/91 |
| 2013/0095787 | A1* | 4/2013 | Kashanian ............. H04W 4/26 |
| | | | 455/406 |
| 2014/0047005 | A1* | 2/2014 | Radar ................ G06Q 30/0241 |
| | | | 709/203 |
| 2014/0074585 | A1* | 3/2014 | Madsen ............. G06Q 30/0239 |
| | | | 705/14.39 |

OTHER PUBLICATIONS

"International Search Report & Written Opinion for PCT Patent Application No. PCT/US2013/056922", dated Jul. 31, 2014, Filed Date: Aug. 28, 2013, 9 Pages.

"Supplementary Search Report Issued in European Patent Application No. 13759101.2", dated Nov. 25, 2016, 7 Pages.

"Managing Client Access to the Windows Store", Published on: Feb. 29, 2012, Available at: http://technet.microsoft.com/en-us/library/hh832040.aspx.

Davis, et al., "Automatic Application Update with User Customisation Integration and Collision Detection for Model Driven Applications", In Proceedings of the World Congress on Engineering and Computer Science, Oct. 19, 2011, 6 pages.

"Access Rights and Visibility How to Use the Make Public or Make Restricted Function", Retrieved on: May 15, 2013, Available at: https://espace.cern.ch/edms-services/faq/Access%20rights%20and%20visibility/How%20to%20use%20the%20Make%20Public%20or%20Make%20Restricted%20function.aspx.

"First Office Action and Search Report Issued in Chinese Patent Application No. 201380077443.4", dated Jul. 4, 2017, 19 Pages.

"Office Action Issued in European Patent Application No. 13759101.2", dated Mar. 7, 2018, 6 Pages.

"Second Office Action Issued in Chinese Application No. 201380077443.4", dated Apr. 8, 2018, 12 Pages.

* cited by examiner

| Release | Name | Limited Release Flag | Operating System Version | App Platform Version | Store version | Enabled for content creation | Client build range |
|---|---|---|---|---|---|---|---|
| 0x08000100 | Operating System | 1 (Public) | 8.0 | 1 | 0 | yes | 0-2222 |
| 0x08000101 | Operating System Next | 3 (restricted) | 8.0 | 1 | 1 | yes | 2223-3333 |

FIG. 6 — 600

| App ID | Release | Other app data |
|---|---|---|
| 1234 | 0x08000100 | <blob> |
| 1234 | 0x08000101 | <blob> |

FIG. 7 — 700

| Release | Name | Limited Release Flag | Operating System Version | App Platform Version | Store version | Enabled for content creation | Client build range |
|---|---|---|---|---|---|---|---|
| 0x08000100 | Operating System | 1 (Public) | 8.0 | 1 | 0 | yes | 0-2222 |
| 0x08000101 | Operating System Next | 1 (public) | 8.0 | 1 | 1 | yes | 2223-3333 |
| 0x08000102 | Operating System Next 2 | 3 (restricted) | 8.0 | 1 | 2 | yes | 3334-4443 |

METHOD, SYSTEM, AND MEDIUM FOR EVENT BASED VERSIONING AND VISIBILITY FOR CONTENT RELEASES

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

Some distributed computing environments including content providers that are used to host content distributed to requesting clients. For example, online stores can be used to sell content, such as, for example, applications, data, etc., to users at other computer systems. When making content available for distribution such as, through an online store, content typically needs to be internally validated and can also be updated (at least from time to time and possibly frequently). It is often important that the content not be exposed to the public prior to unveiling, even during internal validation.

As such, some content providers often chose to take full downtime to update and internally validate new content. However, this makes unveiling take much longer. Taking a full downtime can also prevent distribution of other content offered by the online store, and among other things, can impact revenue generated through the online store. Alternately, new content can include a date setting that indicates a future availability date after which the new content is to go live. However, using a date setting for releasing content limits flexibility and can cause difficulties if a release date changes after the date setting is coded into the content. Other approaches include using a different environment to validate and self-host the content and loading content anew into a production system. However, moving content validation off of the production system requires additional hardware.

BRIEF SUMMARY

The present invention extends to methods, systems, and computer program products for event-based versioning and visibility for content releases. In some embodiments, a plurality of different versions of a portion of content are offered to other devices. A content provider accesses a first version of content. The content provider formulates identifying data for the first version of the content. The identifying data identifies the first version of the content as a version of the content. A first version object is associated with the first version of the content. The first version object indicates that the first version of the content is targeted to a specified version of an operating system. The first version object also includes a first limited release attribute indicating the accessibility of the first version of the content.

The content provider accesses a second different version of the content. The content provider formulates the identifying data for the second version of the content. The identifying data identifies the second version of the content as a version of the content. A second version object is associated with the second version of the content. The second version object indicates that the second version of the content is targeted to the specified version of the operating system. The second version object also includes a second limited release attribute indicating the accessibility of the second version of the content.

The content provider creates a first listing for the first version of the content. The content provider uses the identifying data to indicate the first listing is offering a version of the content and also sets a first visibility for the first listing based on the first limited release attribute. The content provider creates a second listing for the second version of the content. The content provider uses the identifying data to indicate the second listing is offering a version of the content and also sets a second different visibility for the second listing based on the second limited release attribute. The second visibility differing from the first visibility. For example, visibility of the second version of the content can be more or less restricted than visibility of the first version of the content.

The content provider simultaneously makes the first version of the content and the second version of the content available to the other devices. The content provider presents the first listing in accordance with the first visibility to offer the first version of the content to the other devices. The content provider presents the second listing in accordance with the second different visibility to offer the second version of the content to the other devices.

In other embodiments, content is unveiled to other devices. A content provider accesses a version of content. The content provider formulates identifying data for the version of content. A version object is associated with the version of the content. The version object indicates that the version of the content is targeted to a specific version of an operating system. The version object also includes a limited release attribute. The value of the limited release attribute indicates that the version of the content is restricted content and accessibility to the content is limited to users that are authorized to view restricted content.

The content provider formulates a listing for the version of the content. The content provider uses the identifying data to indicate the listing is offering the version of the content. The content provider sets a visibility for the listing so that the version of content is accessible to users authorized to view restricted content but not accessible to other users. The content provider presenting the listing in accordance with the visibility.

Subsequent to presenting the listing, without modification to the version of the content, and while the online store remains operational, the content provider receives input that changes the value of the limited release attribute to a new value. The new value indicates that the version of the content is to be publicly available. The content provider updates the listing for the version of the content by setting a new visibility for the listing. The new visibility indicates that the listing is to be publicly visible. The content provider presents the listing at the online store in accordance with the new visibility.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for event-based versioning and visibility for content releases. In some embodiments, a plurality of different versions of a portion of content are offered to other devices. A content provider accesses a first version of content. The content provider formulates identifying data for the first version of the content. The identifying data identifies the first version of the content as a version of the content. A first version object is associated with the first version of the content. The first version object indicates that the first version of the content is targeted to a specified version of an operating system. The first version object also includes a first limited release attribute indicating the accessibility of the first version of the content.

The content provider accesses a second different version of the content. The content provider formulates the identifying data for the second version of the content. The identifying data identifies the second version of the content as a version of the content. A second version object is associated with the second version of the content. The second version object indicates that the second version of the content is targeted to the specified version of the operating system. The second version object also includes a second limited release attribute indicating the accessibility of the second version of the content.

The content provider creates a first listing for the first version of the content. The content provider uses the identifying data to indicate the first listing is offering a version of the content and also sets a first visibility for the first listing based on the first limited release attribute. The content provider creates a second listing for the second version of the content. The content provider uses the identifying data to indicate the second listing is offering a version of the content and also sets a second different visibility for the second listing based on the second limited release attribute. The second visibility differing from the first visibility. For example, visibility of the second version of the content can be more or less restricted than visibility of the first version of the content.

The content provider simultaneously makes the first version of the content and the second version of the content available to the other devices. The content provider presents the first listing in accordance with the first visibility to offer the first version of the content to the other devices. The content provider presents the second listing in accordance with the second different visibility to offer the second version of the content to the other devices.

In other embodiments, content is unveiled to other devices. A content provider accesses a version of content. The content provider formulates identifying data for the version of content. A version object is associated with the version of the content. The version object indicates that the version of the content is targeted to a specific version of an operating system. The version object also includes a limited release attribute. The value of the limited release attribute indicates that the version of the content is restricted content and accessibility to the content is limited to users that are authorized to view restricted content.

The content provider formulates a listing for the version of the content. The content provider uses the identifying data to indicate the listing is offering the version of the content. The content provider sets a visibility for the listing so that the version of content is accessible to users authorized to view restricted content but not accessible to other users. The content provider presenting the listing in accordance with the visibility.

Subsequent to presenting the listing, without modification to the version of the content, and while the online store remains operational, the content provider receives input that changes the value of the limited release attribute to a new value. The new value indicates that the version of the content is to be publicly available. The content provider updates the listing for the version of the content by setting a new visibility for the listing. The new visibility indicates that the listing is to be publicly visible. The content provider presents the listing at the online store in accordance with the new visibility.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

In general, embodiments of the invention categorize content releases, wherein each release can have a different designation, such as, for example, public, limited, limited for down-level clients, etc. Content (e.g., applications, store pages, ratings, reviews, etc.) offered by a content provider (e.g., an online store) can be associated with a specified operating system/store release. Different versions of the same content can potentially be associated with different specified operating system/store releases.

In some embodiments, content associated with public releases is generally available. On the other hand, content associated with limited releases is available only to users authorized to access limited release content. When a content release is unveiled, the categorization for the content release can be updated so that the corresponding content is publically available without changes to the content itself. Accordingly, content can be tied to a system event helping ensure a consistent view of the content and minimizing the number of operations for changing content visibility.

Figure 1:
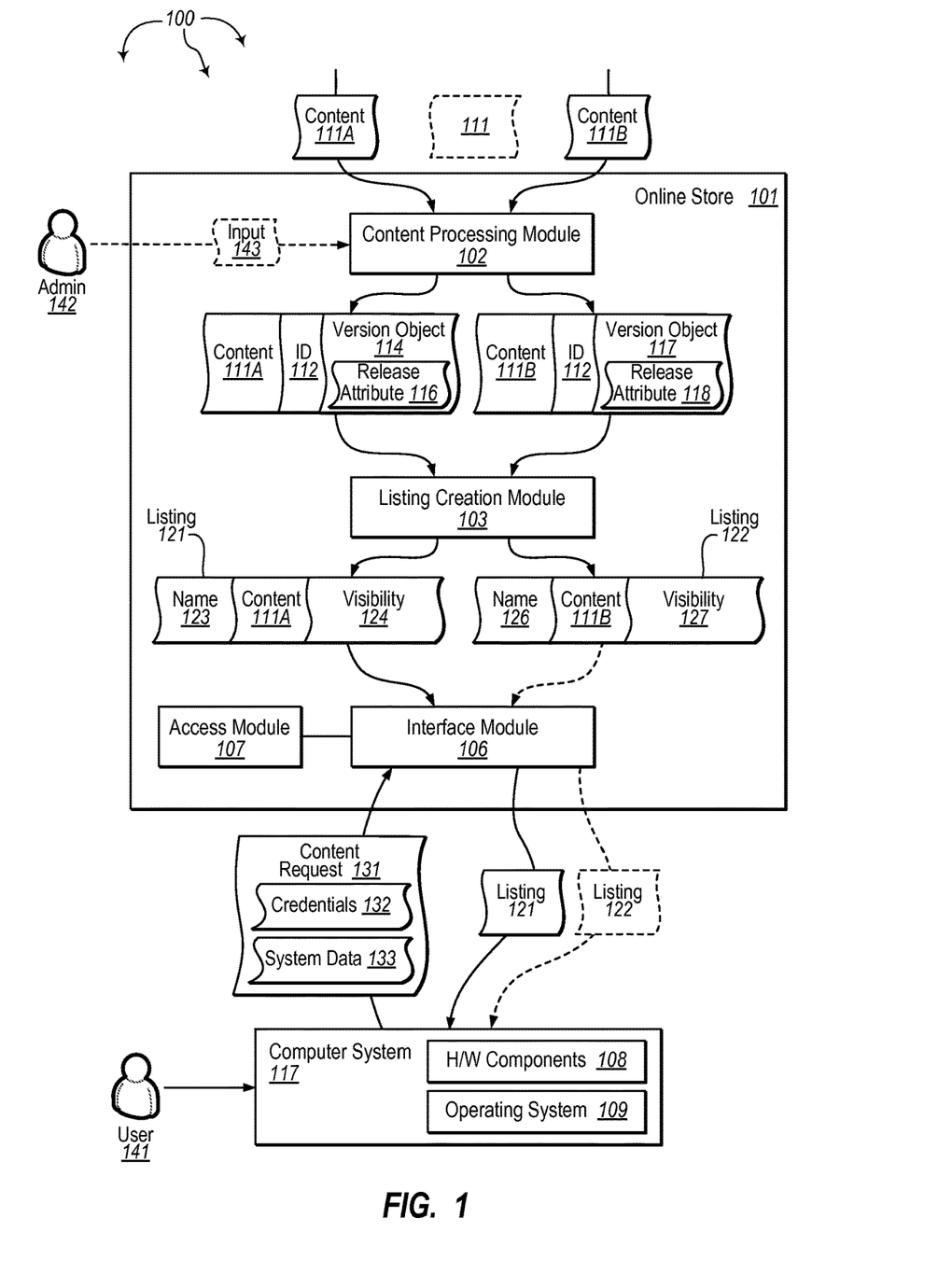
FIG. 1 illustrates an example computer architecture that facilitates offering a plurality of different versions of content to other devices.

FIG. 1 illustrates an example computer architecture 100 that facilitates offering a plurality of different versions of content to other devices. Referring to FIG. 1, computer architecture 100 includes online store 101 and computer system 117. Each of online store 101 and computer system 117 can be connected to one another over (or be part of) a network, such as, for example, a Local Area Network ("LAN"), a Wide Area Network ("WAN"), and even the Internet. Accordingly, online store 101 and computer system 117 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

Referring now to FIG. 1, online store 101 includes content processing module 102, listing creating module 103, interface module 106, and access module 107. Generally, content processing module 102 is configured to access a portion of content formulating identifying data for the content and associate a version object with the content. The version object can indicate that content is directed to a specified version of an operating system and/or that content is directed to a specified version of a platform. The version object can also contain a release attribute. The release attribute indicates accessibility to the content, such as, for example, restricted to authorized users, restricted for down-level systems, or generally accessible.

Listing creation module 103 is configured to access content and corresponding identifying data and a version object. Listing creation module 103 can create a listing for content based on the corresponding identifying data and version object. Listings for content can be given a name, include a link to the content, and have a visibility. The visibility can be determined from the value of a corresponding release attribute. For example, content can be visible to users authorized to access restricted content, to computer systems having a specified configuration, or to any users (on computer systems of any configuration).

Interface module 106 is configured to receive content requests for content hosted at online store 101. Content requests can be for specified content or can include queries having one or more search terms, as well as user credentials and system data. User credentials can correspond to a user requesting the hosted content. System data can indicate a system configuration (e.g., operating system, platform, etc.) for a computer system where the hosted content is to be used. Interface module 106 can retrieve listings for any hosted content that is requested. In some embodiments, interface module 106 matches one or more search terms contained in a query to identify listings. Search terms can include, for example, keywords, content type, content category, content author, date range, etc. In these embodiments, interface module 106 can formulate a set of listings that satisfy the one or more search terms. In other embodiments, interface module 106 retrieves listings for specified content. In these other embodiments, interface 106 can formulate a set of listings for the specified content.

Interface module 106 can send user credentials and system data to access module 107. From a set of listings that otherwise satisfy a content request (e.g., based on one or more search terms), access module 107 filters out listings that, for example, are not from authorized users or do not indicate an appropriate computer system configuration (e.g., operating system version). Access module 107 can include or reference a credentials database to authenticate a user (based on received credentials) and then determine if the user is authorized to access restricted content. Access module 107 can also reference version objects and/or visibility for content to determine if the content is restricted in any way.

Access module 107 can compare an authorization for a user and/or system data for a computer system to data contained in a corresponding version object and/or data indicating a visibility. From the comparison, access module 107 can determine if a listing for content is to be presented to a user. If a listing for content is not to be presented to a user, the listing is removed from the set of listings.

Interface module 106 can present any remaining listings included in the set of listings back to a user at a requesting computer system.

Figure 2:
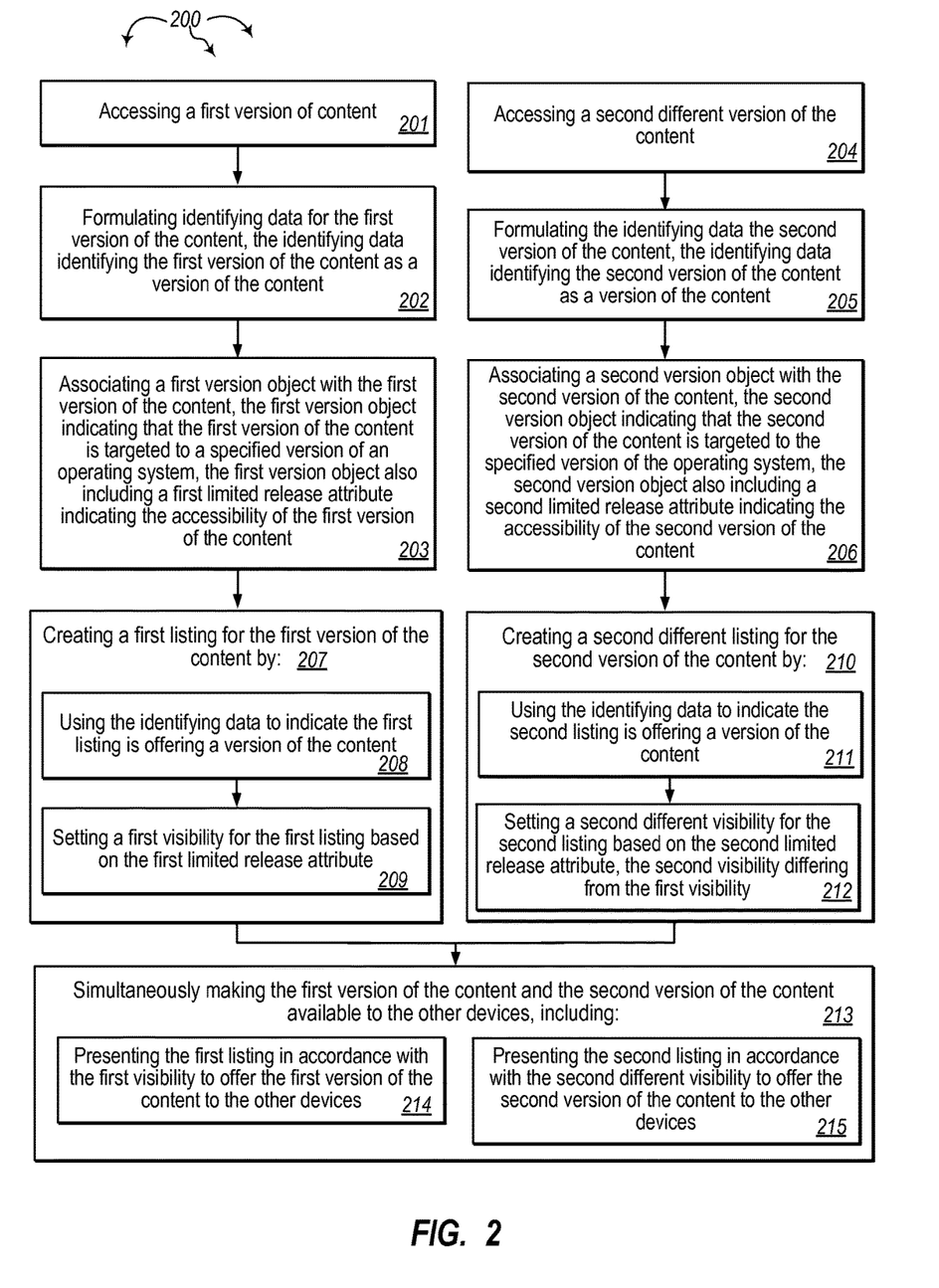
FIG. 2 illustrates a flow chart of an example method for offering a plurality of different versions of content to the other devices.

FIG. 2 illustrates a flow chart of an example method 200 for offering a plurality of different versions of content to other devices. Method 200 will be described with respect to the components and data of computer architecture 100.

Method 200 includes accessing a first version of content (201). For example, content processing module 102 can access content 111A (one version of content 111). Method 200 includes formulating identifying data for the first version of the content, the identifying data identifying the first version of the content as a version of the content (202). For example, content processing module 102 can formulate ID 112 for content 111A. ID 112 identifies content 111A as a version of content 111.

Method 200 includes associating a first version object with the first version of the content, the first version object indicating that the first version of the content is targeted to a specified version of an operating system, the first version object also including a first limited release attribute indicating the accessibility of the first version of the content (203). For example, content processing module 102 can associate version object 114 with content 111A. Version object 114 can indicate that content 111A is target to a specified version of an operating system, such as, for example, a version of Microsoft® Windows® (Windows® 8, Windows® 8.1, etc.), a version of Apple® iOS®, or a version of Google® Android™. As depicted, version object 114 includes release attribute 116. Release attribute 116 can indicate the accessibility of content 111A (e.g., limited, limited for down-level systems, public etc.)

Method 200 includes accessing a second different version of the content (204). For example, content processing module 102 can access content 111B (another version of content 111). Method 200 includes formulating the identifying data the second version of the content, the identifying data identifying the second version of the content as a version of the content (205). For example, content processing module 102 can formulate ID 112 for content 111B. ID 112 identifies content 111B as a version of content 111.

Method 200 includes associating a second version object with the second version of the content, the second version object indicating that the second version of the content is targeted to the specified version of the operating system, the second version object also including a second limited release attribute indicating the accessibility of the second version of the content (206). For example, content processing module 102 can associate version object 117 with content 111B. Version object 117 can indicate that content 111B is target to the specified version of an operating system, such as, for example, a version of Microsoft® Windows® (e.g., Windows® 8, Windows® 8.1. etc.), a version of Apple® iOS®, or a version of Google® Android™. As depicted, version object 117 includes release attribute 118. Release attribute 118 can indicate the accessibility of content 111A (e.g., limited, limited for down-level systems, public, etc.). The accessibility of content 111B can be the same as or differ from the visibility of content 111A.

Method 200 includes creating a first listing for the first version of the content (207). For example, listing creation module 103 can create listing 121 for content 111A. Listing 121 includes name 123, content 111A (or a link to content 111A), and visibility 124. Creating a first listing for the first version of the content includes using the identifying data to indicate the first listing is offering a version of the content (208). For example, listing creation module 103 can use ID 112 to indicate that listing 121 is offering a version content 111 (e.g., by creating name 123).

Creating a first listing for the first version of the content includes setting a first visibility for the first listing based on the first limited release attribute (209). For example, listing creation module 103 can set visibility 124 for listing 121, based on and corresponding to release attribute 116. When release attribute 116 indicates that content 111A is publicly accessible, visibility 124 can indicate that listing 121 is publicly visible. On the other hand, when release attribute 116 indicates any limitations on the accessibility of content 111A, visibility 124 can indicate that listing 121 has corresponding limitations on visibility, for example, limited to authorized users, limited to specified operating system/platform versions, etc.

Method 200 includes creating a second different listing for the second version of the content (210). For example, listing creation module 103 can create listing 122 for content 111B. Listing 122 includes name 126, content 111B (or a link to content 111B), and visibility 127. Creating a second different listing for the second version of the content includes using the identifying data to indicate the second listing is offering a version of the content (211). For example, listing creation module 103 can use ID 112 to indicate that listing 122 is offering a version content 111 (e.g., by creating name 126).

Creating a second different listing for the second version of the content includes setting a second different visibility for the second listing based on the second limited release attribute, the second visibility differing from the first visibility (212). For example, listing creation module 103 can set visibility 127 for listing 122, based on and corresponding to release attribute 117. When release attribute 118 indicates that content 111B is publicly accessible, visibility 127 can indicate that listing 122 is publicly visible. On the other hand, when release attribute 118 indicates any limitations on the accessibility of content 111B, visibility 127 can indicate that listing 122 has corresponding limitations on visibility, for example, limited to authorized users, limited to specified operating system/platform versions, etc. Visibility 127 can differ from visibility 124.

In other embodiments, visibility 124 and visibility 127 can be the same (e.g., both indicating public visibility, both limiting visibility to authorized users, etc.)

Method 200 includes simultaneously making the first version of the content and the second version of the content available to the other devices (213). For example, online store 101 can simultaneously make content 111A and content 111B available to computer system 117 (as well as other computer systems). Computer system 117 can have any of a variety of described different system configurations, including mobile phone, desktop computer, etc.

Simultaneously making the first version of the content and the second version of the content available to the other devices, presenting the first listing in accordance with the first visibility to offer the first version of the content to the other devices (214). For example, listing 121 can be presented in accordance with visibility 124 to offer content 111A to computer system 117 (as well as other computer systems). Simultaneously making the first version of the content and the second version of the content available to the other devices, presenting the second listing in accordance with the second different visibility to offer the second version of the content to the other devices (215). For example, listing 122 can be presented in accordance with visibility 127 to offer content 111B to computer system 117 (as well as other computer systems).

Subsequent to listings 121 and 122 being created, user 141 can enter input at computer system 117 causing computer system 117 to issue content request 131 to online store 101. As depicted, content request 131 includes credentials 132 (for user 132) and system data 133 (for computer system 117). System data 133 can indicate one or more properties of hardware components 108 and operating system 109. Operating system 109 can be a version of the operating system, which may or may not be the specified version of the operation system. It may be that listings 121 and 122 are included in a set of listings that match search term contained in content request 131.

Based on credentials 132, system data 133, and visibilities 124 and 127, access module 107 can determine if one or more of listings 121 and 122 can be returned to computer system 117. For example, if visibility 124 indicates that listing 121 is publicly visible, listing 121 can be returned to computer system. If visibility 27 indicates that listing 122 is limited to authorized users, access module 107 can authenticate user 141 based on credentials 132. Access module 107 can then determine if user 141 is an authorized user. If user 141 is authorized, listing 122 can be returned to computer system 117. On the other hand, if user 141 is not authorized listing 122 is not returned to computer system 117.

Similarly, if visibility 127 indicates that listing 122 is not to be visible to down-level systems, access module 107 can compare system data 133 to version object 117. If a platform and/or operating system version represented in system data 133 is at least as recent as a platform and/or operating system version represented in version object 117, listing 122 can be returned to computer system 117. If, on the other hand, a platform and/or operating system version represented in system data 133 is older than a platform and/or operating system version represented in version object 117, listing 122 is not returned to computer system 117.

As indicated by the dashed line, whether or not online store 101 returns listing 122 to computer system 117 is dependent on credentials 132 and/or system data 133.

In some embodiments, content processing module 103 processes new content essentially automatically as the new content is received. In other embodiments, content processing module 103 processes new content in response to input from an administrator. For example, admin 142 can submit input 143. Input 143 can be a command to cause content processing module 102 to process content. In response to input 143, content processing module 103 can process one or more of content 111A and content 111B. In either embodiment, content can be processed and listings created while online store 101 is up and running.

Figure 3:
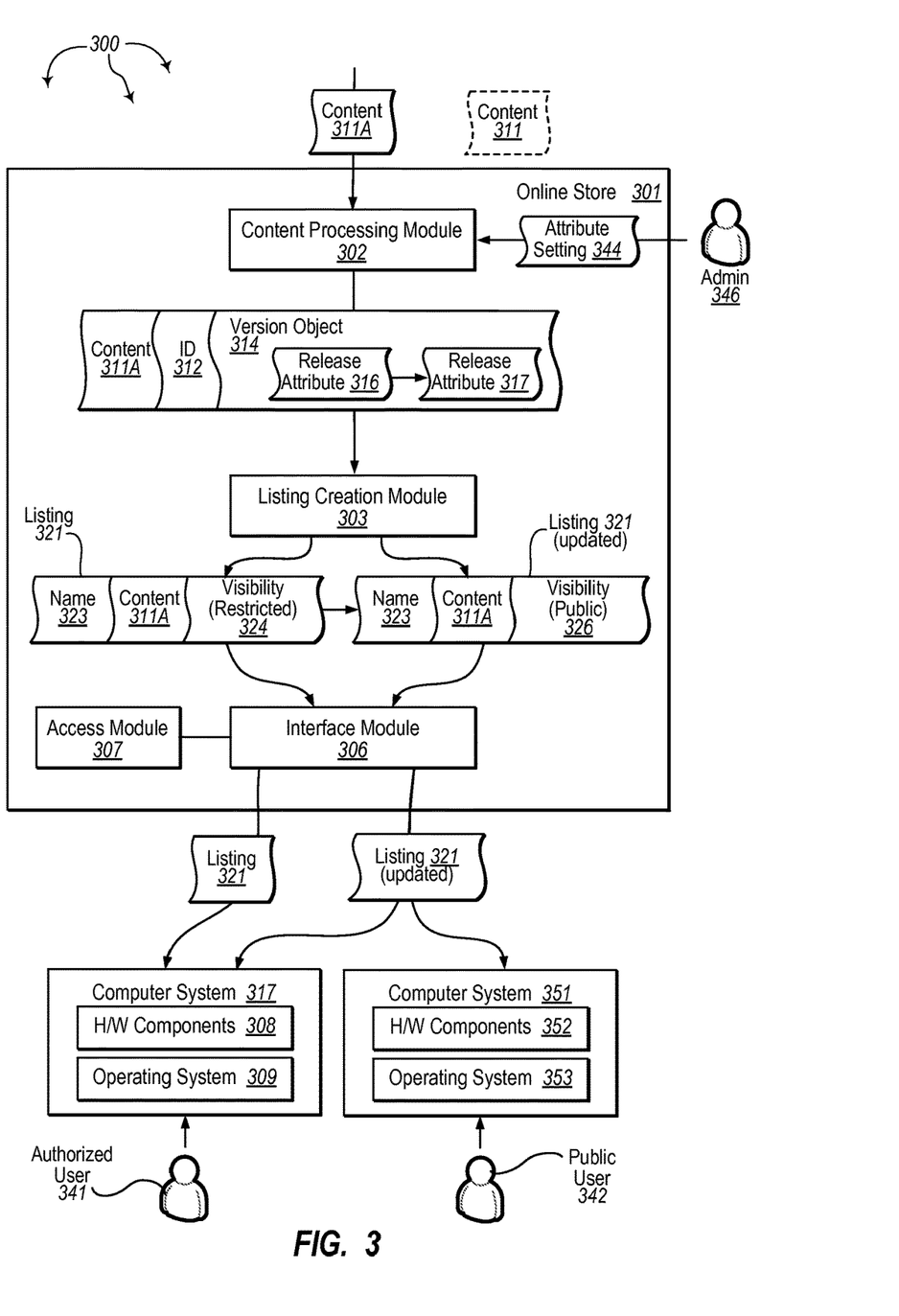
FIG. 3 illustrates an example computer architecture that facilitates unveiling content to other devices.

FIG. 3 illustrates an example computer architecture 300 that facilitates unveiling content to the other devices. Referring to FIG. 3, computer architecture 300 includes online store 301 and computer systems 317 and 351. Each of online store 301 and computer systems 317 and 351 can be connected to one another over (or be part of) a network, such as, for example, a Local Area Network ("LAN"), a Wide Area Network ("WAN"), and even the Internet. Accordingly, online store 301 and computer systems 317 and 351 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

As depicted, online store 301 includes content processing module 302, listing creation module 303, interface module 306, and access module 307. Generally, content processing module 302, listing creation module 303, interface module 306, and access module 307 are similarly configured to content processing module 102, listing creation module 103, interface module 106, and access module 107 respectively.

Figure 4:
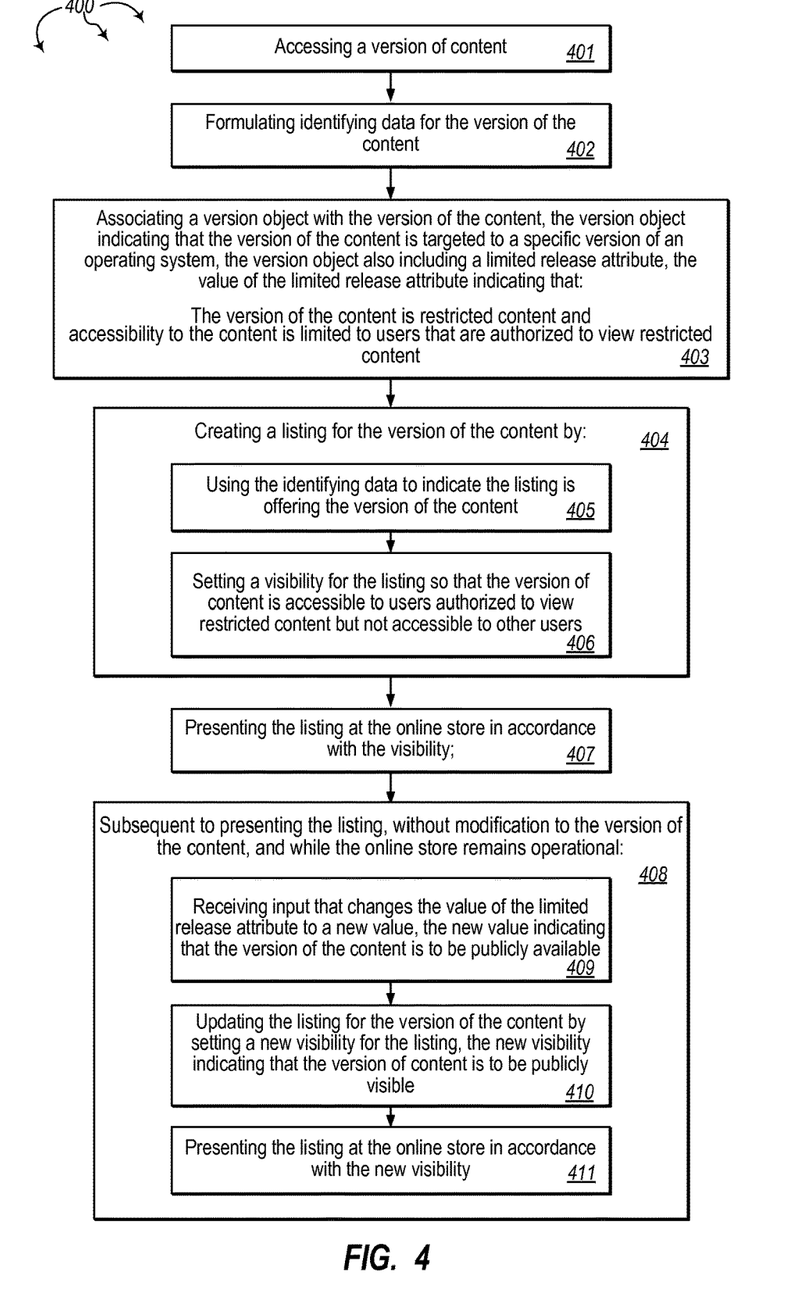
FIG. 4 illustrates a flow chart of an example method for unveiling content to other devices.

FIG. 4 illustrates a flow chart of an example method 400 for unveiling content to the other devices. Method 400 will be described with respect to the components and data of computer architecture 300.

Method 400 includes accessing a version of content (401). For example, content processing module can access content 311. Method 400 includes formulating identifying data for the version of the content (402). For example, content processing module 302 can formulate ID 312 for content 311A. ID 312 identifies content 311A as a version of content 311.

Method 400 includes associating a version object with the version of the content, the version object indicating that the version of the content is targeted to a specific version of an operating system, the version object also including a limited release attribute, the value of the limited release attribute indicating that: the version of the content is restricted content and accessibility to the content is limited to users that are authorized to view restricted content (403). For example, content processing module 302 can associate version object 314 with content 311A. Version object 314 can indicate that content 311A is target to a specified version of an operating system, such as, for example, a version of Microsoft® Windows® (Windows® 8, Windows® 8.1, etc.), a version of Apple® iOS®, or a version of Google® Android™. As depicted, version object 314 includes release attribute 316. Release attribute 316 can indicate that content 311A is restricted content and that accessibility to content 311A is limited to users that are authorized to access restricted content.

Creating a listing for the version of the content (404). For example, listing creation module can create listing 321 for connect 311A. Listing 321 includes name 323, content 311A (or a link to content 311A), and visibility 324. Creating a listing for the version of the content includes using the identifying data to indicate the listing is offering the version of the content (405). For example, listing creation module 303 can use ID 312 to indicate that listing 321 is offering a version content 311 (e.g., by creating name 323).

Creating a listing for the version of the content includes setting a visibility for the listing so that the version of content is accessible to users authorized to view restricted content but not accessible to other users (406). For example, listing creation module 303 can set visibility 324 for listing 321, based on and corresponding to release attribute 316. Visibility 324 can indicate that the visibility of listing 321 is limited to users authorized to access restricted content.

Method 400 includes presenting the listing at the online store in accordance with the visibility (407). For example, listing 321 can be presented in accordance with visibility 324 to offer content 311A to computer systems 317 and 352 (as well as other computer systems).

Subsequent to listing 321 being created, authorized user 341 can enter input at computer system 317 causing computer system 317 to issue a content request to online store 301. Access module 307 can check credentials for authorized user 341 to determine that authorized user 341 is authorized to access content 311A. Based on the determination, online store 301 can return listing 321 to computer system 317.

Public user 342 can also enter input at computer system 351 causing computer system 351 to issue a content request to online store 301. Access module 307 can check credentials for public user 342 to determine that public user 342 is not authorized to access content 311A. Based on the determination, online store 301 does not return listing 321 to computer system 351.

Admin 346 can send attribute setting 344 to online store 301. Attribute setting 344 indicates to online store 301 that content associated with version object 314 (including content 311A and any other content) is to be unveiled to the public.

Subsequent to presenting the listing, without modification to the version of the content, and while the online store remains operational, method 400 includes receiving input that changes the value of the limited release attribute to a new value, the new value indicating that the version of the content is to be publicly available (408). For example, subsequent to presenting listing 321, without modification to content 311A, and while online store 301 remains operational, content processing module 302 can receive attribute setting 344 from administrator 346. Content processing module 302 can process attribute setting 344 to transition from release attribute 316 to release attribute 317. Release attribute 317 represents that content 311A is to be publicly available (i.e., unveiled to the public).

Subsequent to presenting the listing, without modification to the version of the content, and while the online store remains operational, method 400 includes updating the listing for the version of the content by setting a new visibility for the listing, the new visibility indicating that the version of content is to be publicly visible (409). For example, subsequent to presenting listing 321, without modification to content 311A, and while online store 301 remains operational, listing creation module 303 can update listing 321 by setting new visibility 326 for the listing 321. Visibility 326 indicates that listing 321 is publicly visible. Visibility 326 can be determined from release attribute 317.

Subsequent to presenting the listing, without modification to the version of the content, and while the online store remains operational, method 400 includes presenting the listing at the online store in accordance with the new visibility (410). For example, listing 321 (updated) can be presented in accordance with visibility 326 to offer content 311A to computer systems 317 and 352 (as well as other computer systems).

Subsequent to listing 321 being updated, authorized user 341 can enter input at computer system 317 causing computer system 317 to issue a content query to online store 301. Access module 307 can determine that listing 321 is visible to the general public and can return listing 321 to computer system 317. Similarly, public user 342 can also enter input at computer system 351 causing computer system 351 to issue a content request to online store 301. Access module 307 can determine that listing 321 is visible to the general public and can return listing 321 to computer system 351.

In some embodiments, computer system 317 and/or computer system 351 also send system data to online store 301. System data for computer system 317 can be derived from hardware components 308 and operation system 309 (e.g., a version of the operating system, which may or may not be the specified version of the operating system). System data for computer system 351 can be derived from hardware components 352 and operation system 353 (e.g., a version of the operating system, which may or may not be the specified version of the operating system).

Online store 301 can receive the system data. When content 311A is restricted from being distributed to down-level systems (as indicated by release attribute 317), access module 307 can check received system data to determine whether computer system 317 and/or computer system 351 is a down-level system. When a computer system is a down-level system, listing 321 is not represented to the computer system.

In some embodiments, an online store system defines a version object including four parts: minor/major versions of an operating system, an application platform version, and store specific version. The four part tuple can be stored as an integer. In some embodiments, operating system version and application platform version match corresponding values on a machine where a store client is installed. Store specific portions of the version object permit the version object to have unique values at the discretion of personnel managing an online store. These values can be viewed as releases.

Objects in an online Store (applications, packages, spotlight and category pages, topic pages, client pages, ratings, reviews, etc) are versioned and associated with one OSVersion value (release). For example, a single application (with a single Product GUID and package family name) can have multiple versions, each associated with a different release. Thus advantageously, multiple versions of a content object (such as application or page) can exist at the same time and share key identifying data while exhibiting different applicability and accessibility behavior.

A version object can include a limited release attribute which determines accessibility level of all objects associated with a content release. A LimitedRelease value of 1 can indicate that objects in a release are publicly accessible. A LimitedRelease value of 2 can indicate can indicate that objects in a release are accessible to the general public using a current version of an operating system but not to the down-level systems. A LimitedRelease value of 3 can indicate that the objects in a release are accessible only to the users authorized to see restricted versions. Authorization checks can be based on a user's online store account. If a caller of an API is attempting to access content designated for a release with LimitedRelease value of 3, the API layer can perform an authorization check to validate that the user is entitled to access the content. Other LimitedRelease values can also be used to indicate that content has other different restrictions.

As such, personnel managing an online store have flexibility to define any number of releases for the same operating system and application platform. For example, personnel can define a first (public) release value with a LimitedRelease value of 1 and a second (restricted) release (such as for the next version of an operating system) with LimitedRelease value of 3. Content created for the second release is visible to authorized users and can be prepared, validated, and self-hosted internally. Users that are not successfully authorized cannot see content created for the second release.

When the second release is to become public, personnel can modify the LimitedRelease attribute of the second release to be either 2 or 1. Modifying the LimitedRelease attribute makes content associated with the second release public without any direct content modifications or re-upload. For the non-authorized users, the content as if it has just been uploaded into the online. At the same time, a third (new) release value may be introduced into the system, allowing content preparation to begin for the next version.

Accordingly, at content creation time, content authors are able to choose from the list of active releases (e.g., OSVersion values) that permit content creation and create content associated with those releases. A similar permission check may be defined to control access to the restricted releases for content creation. At content consumption time (e.g., from a store client), the determination of the appropriate release can be based on operating system and application platform version applicability, the build number of the store client, and logged in user's permissions to access restricted LimitedRelease content. The tuple can be mapped to a single release value in OSVersion list. Once release value is determined, it can be used to retrieve remaining content requested by the client. Some content objects may define a fallback mechanism (if no object matching an exact release has been found, the next highest value one is available). Other content objects may choose to return no value when an exact match is not found.

Figure 5:
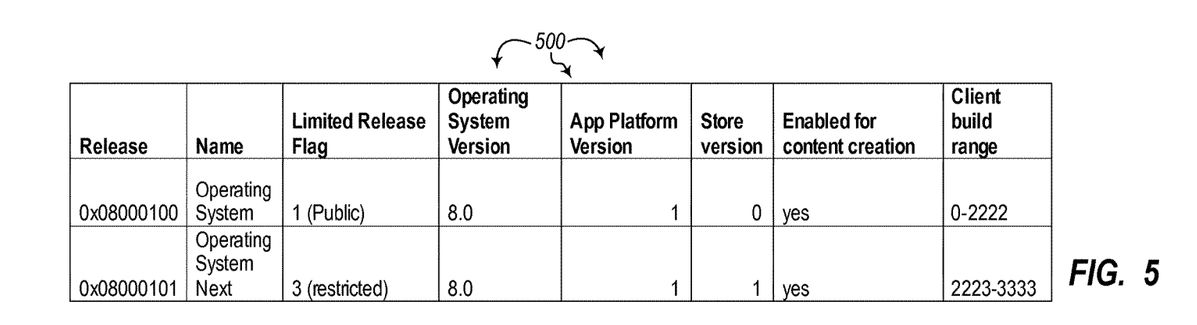
FIG. 5 illustrates an example definition of a version object table.
Figure 6:
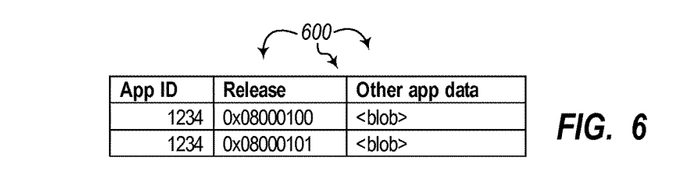
FIG. 6 illustrates an example definition of application metadata storage.
Figure 7:
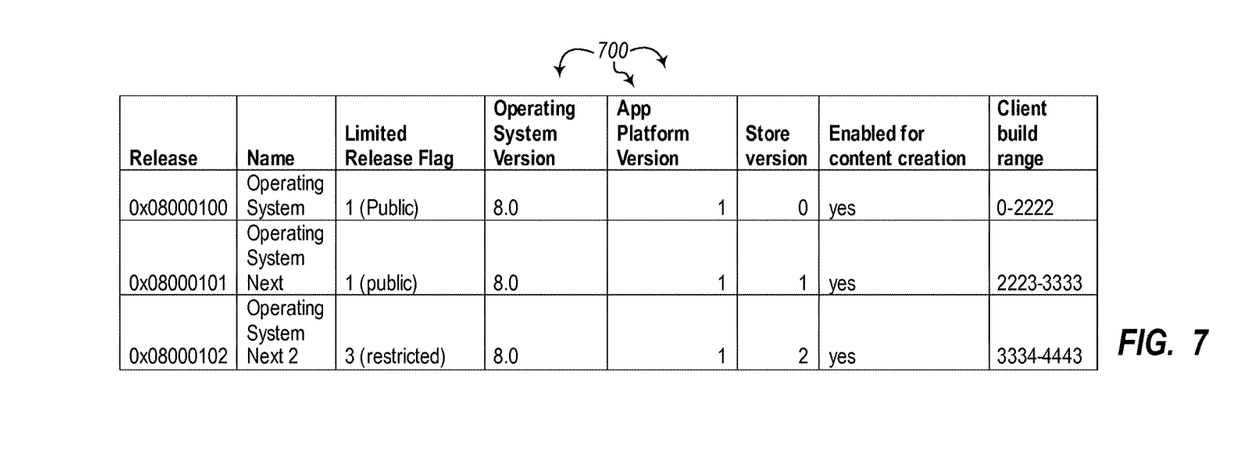
FIG. 7 illustrates an example change to a version object table.

FIG. 5 illustrates an example definition of a version object table 500. In FIG. 5 depicts two releases (one public and one restricted). FIG. 6 illustrates an example definition of application metadata storage 600. FIG. 6 depicts two versions of an application (identified by application ID 1234). Each version of the application is associated with a different release. FIG. 7 illustrates an example change to a version object table 500. As depicted in FIG. 7, release 0x08000101 is made public and a new restricted release 0x08000101 is added.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method for use at a first computer system, the method comprising:

receiving a content request from a second computer system including one or more search terms, system data for the second computer system, and user credentials;

accessing a first version object corresponding to a first version of content, the first version object indicating that the first version of the content is targeted to a computer system configuration, the first version object also including a first release attribute indicating a first accessibility to users;

accessing a second version object corresponding to a second version of the content, the second version object indicating that the second version of the content is targeted to the computer system configuration, the second version object also including a second release attribute indicating a second accessibility to users, the second accessibility differing from the first accessibility;

determining at least one content listing that matches the one or more search terms, is visible to the user, and is usable at the second computer system, wherein determining the at least one content listing comprises comparing the system data for the second computer system with the computer system configuration associated with the first version object and the second version object based in part on an indication in the at least one content listing that the at least one content listing is not to be visible to a system having a restricted system level, and wherein determining the at least one content listing further comprises comparing user authorization to access restricted content in accordance with the user credentials with information in the first release attribute and the second release attribute; and sending the at least one content listing to the second computer system.

2. The method of claim 1, wherein determining the at least one content listing comprises:
   determining that the first version of the content is accessible to the general public based on the first release attribute; and
   including a listing for the first version of the content in the at least one content listing.

3. The method of claim 1, wherein determining the at least one content listing comprises:
   determining that the first version of the content is not accessible to the user based on the first release attribute and the system data; and
   omitting a listing for the first version of the content from the at least one content listing.

4. The method of claim 1, wherein determining the at least one content listing comprises:
   determining that the first version of the content is not accessible to the user based on the first release attribute and the user authorization to restricted content; and
   omitting a listing for the first version of the content from the at least one content listing.

5. The method claim 4, further comprising:
   receiving a change to a value of the first release attribute in the first version object, the changed value indicating that the first version of the content is accessible to the general public;
   automatically updating the at least one content listing to include the listing for the first version of the content based on the changed value of the first release attribute; and
   automatically sending the updated at least one content listing to the second computer system.

6. The method of claim 5, wherein updating the at least one content listing and sending the updated at least one content listing to the second computer system comprises unveiling a public version of the first version of the content to the user at the second computer system.

7. The method of claim 1, wherein the restricted system level comprises a down-level system, and one of the first or second release attributes indicates that one of the first or second versions of the content is restricted from being distributed to the down-level system.

8. The method of claim 1, wherein the first version object indicates a minor/major operating system version part, an application platform version part, and a store specific version part.

9. The method of claim 1, wherein the at least one content listing comprises one or more of applications, store pages, ratings, or reviews.

10. The method of claim 1, wherein the system data is derived from hardware components at the second computer system.

11. A computer system, comprising:
    a processor;
    system memory coupled to the processor and storing instructions configured to cause the processor to:
      receive a content request from another computer system including one or more search terms, system data for the other computer system, and user credentials;
      access a first version object corresponding to a first version of content, the first version object indicating that the first version of the content is targeted to a computer system configuration, the first version object also including a first release attribute indicating a first accessibility to users;
      access a second version object corresponding to a second version of the content, the second version object indicating that the second version of the content is targeted to the computer system configuration, the second version object also including a second release attribute indicating a second accessibility to users, the second accessibility differing from the first accessibility;
      determine at least one content listing that matches the one or more search terms, is visible to the user, and is usable at the other computer system, wherein determining the at least one content listing comprises comparing the system data for the other computer system with the computer system configuration associated with the first version object and the second version object based in part on an indication in the at least one content listing that the at least one content listing is not to be visible to a system having a restricted system level, and wherein determining the at least one content listing further comprises comparing user authorization to access restricted content in accordance with the user credentials with information in the first release attribute and the second release attribute; and
      send the at least one content listing to the other computer system.

12. The computer system of claim 11, wherein the instructions configured to cause the processor to determine the at least one content listing comprise instructions configured to cause the processor to:
    determine that the first version of the content is accessible to the general public based on the first release attribute; and
    include a listing for the first version of the content in the at least one content listing.

13. The computer system of claim 11, wherein the instructions configured to cause the processor to determine the at least one content listing comprise instructions configured to cause the processor to:
    determine that the first version of the content is not accessible to the user based on the first release attribute and the system data; and
    omit a listing for the first version of the content from the at least one content listing.

14. The computer system of claim 11 wherein the instructions configured to cause the processor to determine the at least one content listing comprise instructions configured to cause the processor to:
    determine that the first version of the content is not accessible to the user based on the first release attribute and the user authorization to access restricted content; and
    omit a listing for the first version of the content from the at least one content listing.

15. The computer system of claim 14, further comprising instructions configured cause the processor to:
    receive a change to a value of the first release attribute in the first version object, the changed value indicating that the first version of the content is accessible to the general public;
    update the at least one content listing to include the listing for the first version of the content based on the changed value of the first release attribute; and
    send the updated at least one content listing to the other computer system.

16. The computer system of claim 15, wherein the instructions configured to cause the processor to update the at least one content listing and send the updated at least one content listing to the other computer system comprise instructions configured to cause the processor to unveil a public version of the first version of the content to the user at the other computer system.

17. The computer system of claim 11, wherein the first version object indicates a minor/major operating system version part, an application platform version part, and a store specific version part.

18. The computer system of claim 11, wherein the at least one content listing comprises one or more of applications, store pages, ratings, or reviews.

19. The computer system of claim 11, wherein the instructions configured to cause the processor to receive the content request from the other computer system comprise instructions configured to cause the processor to receive the content request including the system data derived from hardware components at the other computer system.

20. One or more computer storage media having computer-executable instructions that, upon execution by a processor, cause the processor to at least:
- receive a content request from another computer system including one or more search terms, system data for the other computer system, and user credentials;
- access a first version object corresponding to a first version of content, the first version object indicating that the first version of the content is targeted to a computer system configuration, the first version object also including a first release attribute indicating a first accessibility to users;
- access a second version object corresponding to a second version of the content, the second version object indicating that the second version of the content is targeted to the computer system configuration, the second version object also including a second release attribute indicating a second accessibility to users, the second accessibility differing from the first accessibility;
- determine at least one content listing that matches the one or more search terms, is visible to the user, and is usable at the other computer system, wherein determining the at least one content listing comprises comparing the system data for the other computer system with the computer system configuration associated with the first version object and the second version object based in part on an indication in the at least one content listing that the at least one content listing is not to be visible to a system having a restricted system level, and wherein determining the at least one content listing further comprises comparing user authorization to access restricted content in accordance with the user credentials with information in the first release attribute and the second release attribute; and
- send the at least one content listing to the other computer system.

\* \* \* \* \*